United States Patent [19]

De Bot

[11] Patent Number: 5,528,581
[45] Date of Patent: Jun. 18, 1996

[54] DIVERSITY TRANSMISSION SYSTEM FOR SUB-BAND DIVERSITY RECEPTION

[75] Inventor: Paulus G. M. De Bot, Eindhoven, Netherlands

[73] Assignee: U.S. Philips Corporation, New York, N.Y.

[21] Appl. No.: 160,001

[22] Filed: Nov. 30, 1993

[30] Foreign Application Priority Data

Dec. 1, 1992 [EP] European Pat. Off. .............. 92120487

[51] Int. Cl.⁶ ....................................................... H04J 1/08
[52] U.S. Cl. .............................. 370/19; 370/70; 370/123; 375/347; 375/349; 455/138; 455/273; 455/306
[58] Field of Search ........................................ 455/137, 138, 455/139, 273, 133, 134, 272, 303, 305, 306, 307, 52.1; 375/100, 102; 370/19, 23, 69.1, 70, 85.9, 123

[56] References Cited

U.S. PATENT DOCUMENTS

| | | | |
|---|---|---|---|
| 4,641,318 | 2/1987 | Addeo | 375/100 X |
| 4,715,048 | 12/1987 | Masamura | 375/100 |
| 4,733,402 | 3/1988 | Monsen | 375/100 |
| 4,768,187 | 8/1988 | Marshall | 370/69.1 |
| 5,191,576 | 2/1993 | Pommier et al. | 370/18 |

OTHER PUBLICATIONS

Microwave Mobile Communication, 1974, Wiley, pp. 422–431.
Analysis and Simulation of a Digital Mobile Channel Using Orthogonal Frequency Division Multiplexing, L. J. Cimini, IEEE Transactions on Communications, vol. Com–33, No. 7, Jul. 1985.
"Linear Diversity Combining Techniques", by D. G. Brennan, Jun. 1959, pp. 1075–1102, Proceedings of the IRE.

Primary Examiner—Douglas W. Olms
Assistant Examiner—Russell W. Blum
Attorney, Agent, or Firm—Steven R. Biren

[57] ABSTRACT

In a diversity transmission system the problem arises that almost no improvement can be obtained when the signals to be received show frequency selective fading within the band width of the signal to be transmitted. To solve this problem the signal to be received is separated by filter banks into a number of sub-band signals. Corresponding sub-band signals of different filter banks are combined by the combiners into combined sub-band signals. These combined sub-band signals are combined to a broad band signal by a final combiner.

14 Claims, 5 Drawing Sheets

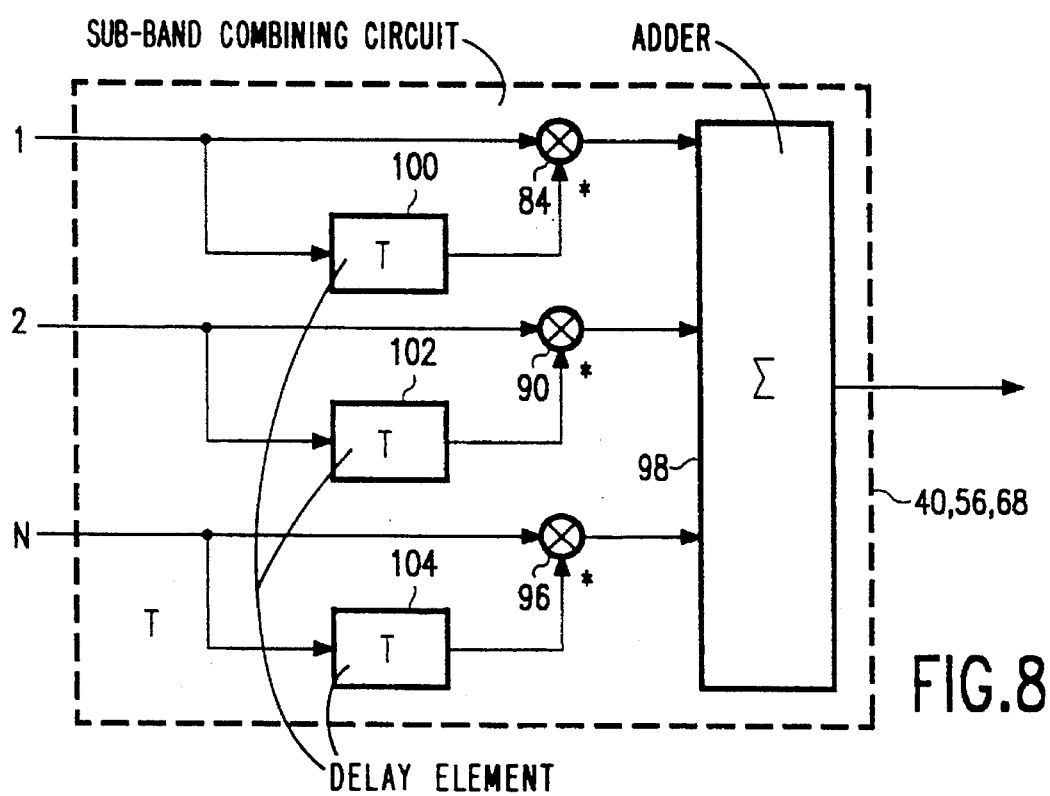

5,528,581

DIVERSITY TRANSMISSION SYSTEM FOR SUB-BAND DIVERSITY RECEPTION

BACKGROUND OF THE INVENTION

The invention is related to a diversity transmission system comprising a transmitter, being coupled to a receiver via various channels, which receiver comprises combining means for combining the output signals of the channels.

The invention is also related to a receiver for use in such a system.

A system according to the preamble is known from the paper "Linear Diversity combining techniques" by D. G. Brennan in Proceedings of the IRE, June 1959.

Diversity transmission systems are used for transmission of information via channels which can have various degrees of transmission quality, which even can be time dependent. To prevent a degraded transmission quality a number of such channels are used in parallel, and the output signals of such channels are combined. This combination can be performed in many ways, for example by simply adding the output signals of the channels, selecting the best channel or determining a weighted sum of the output signals of the channels. Also the weighting factor can be determined in various ways.

In certain circumstances where the transmission quality of all channels involved is unsatisfactory, the improvement that can be obtained using diversity reception can be very modest.

SUMMARY OF THE INVENTION

The object of the invention is to provide a diversity transmission system having an improved performance when the quality of the transmission channels is unsatisfactory.

Therefor the diversity transmission system according to the invention is characterized in that the combining means comprise separating means for separating the output signal of each channel into a number of sub-band signals and in that the combining means comprises sub-band combining means for combining corresponding sub-band signals from different channels into combined sub-band signals.

The invention is based on the insight that in certain circumstances the transmission quality of only a part of the total transmission frequency band is unsatisfactory, and that this part is different for different channels. By splitting the output signal of each channel into a number of sub-band channels, it is possible to combine satisfactorily transmitted sub-band signals from different channels to obtain a finally combined signal of a satisfactory overall transmission quality.

An embodiment of the invention is characterized in that the receiver comprises a number of antennas at different positions for obtaining the output signal of a corresponding channel. In this embodiment each channel comprises the radio link between a transmitter and the corresponding antenna. Measurements have proven that for indoor reception the received signal display deep spectral notches, being very dependent on the place of the position of the antenna, so that consequently an important improvement can be obtained by combining sub-band signals in contradistinction to combining of the complete signal to be transmitted.

A further embodiment of the invention is characterized in that the receiver comprises a number of antennas having different polarization states for obtaining the output signal of a corresponding channel. Using antennas having a different polarization state is another possibility to obtain signals which can be used in the invention. The polarization states can comprise different linear polarization directions, but they can also comprise left hand or right hand rotating circular or elliptical polarization. Also combinations of linear and circular/elliptical polarization are conceivable. A further possibility is the use of antennas receiving signals from different directions.

A further embodiment of the invention is characterized in that the output signal of a channel comprises a Frequency Division Multiplexed signal, and in that a sub-band comprises at least one component of the frequency division multiplexed signal. By choosing the sub-bands in correspondence to the frequency division multiplexed parts of the received signal, the separating means are simultaneously used for separating the received signals into sub-bands for the diversity reception, and for demultiplexing the received (frequency division multiplexed) signal.

A further embodiment of the invention is characterized in that the output signal of a channel comprises an Orthogonally Frequency Division Multiplexer signal. By using the invention for Orthogonal Frequency Division Multiplexed signals, a significant improvement can be obtained without much extra implementation costs, because the splitting of the received signal into a number of sub-bands leads to a reduction of the complexity or even the total absence of the demultiplexing means for obtaining the different sub-channels of the OFDM signals.

BRIEF DESCRIPTION OF THE DRAWING

The invention will now be described in more detail with reference to the drawing figures, in which:

FIG. 8 shows a third embodiment of the sub-band combining means in the FIGS. 3, 4 and 5.

DESCRIPTION OF THE PREFERRED EMBODIMENTS

Figure 1:
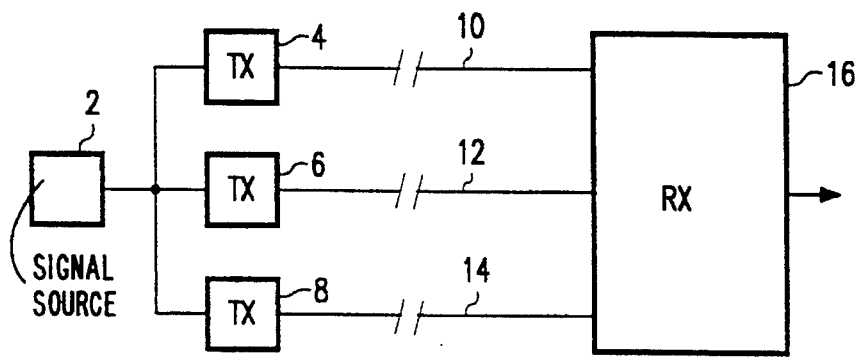
FIG. 1 shows a first diversity transmission system in which the invention can be used.

In the transmission system according to FIG. 1, an output of a signal source 2 is connected to an input of transmitters 4, 6 and 8. An output of the transmitter 4 is coupled to a first input of a receiver 16 via a channel 10. An output of the transmitter 6 is coupled to a second input of the receiver 16 via a channel 12 and an output of the transmitter 8 is coupled to a third input of the receiver 16 via a channel 14. At the output of the receiver 16 a destination signal is available.

In the transmission system according to FIG. 1 the source signal is transmitted via three separate channels 10, 12 and 14 by means of the transmitters 4, 6 and 8. The receiver 16 derives from the three input signals the destination signal for further processing by combining the input signals in a suitable manner.

Figure 2:
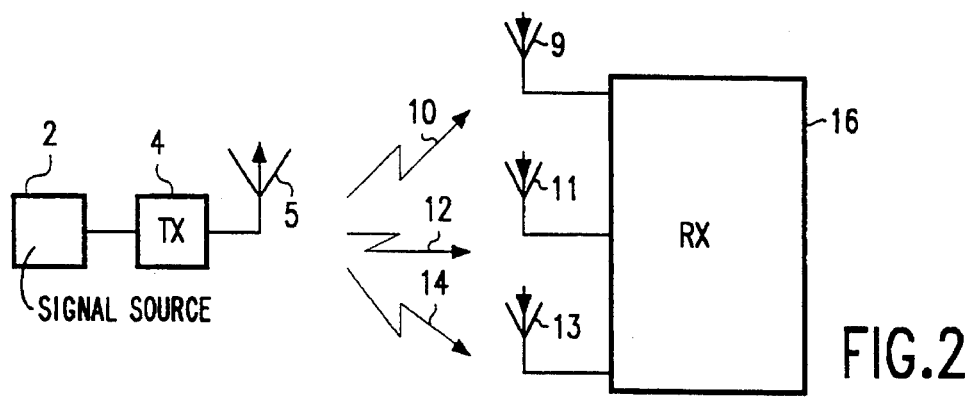
FIG. 2 shows a second diversity transmission system in which the invention can be used.

In the transmission system according to FIG. 2, a signal source 2 is coupled to a single transmitter 4 which is in turn coupled to a transmitting antenna 5. Three inputs of the receiver 16 are each coupled to a corresponding receiving antenna 9, 11 or 13. The channel comprises now the three radio links 10, 11 and 12 between the common transmitting antenna and the different receiving antennas 9, 11 and 13. It is evident that the number of channels in the transmission systems according to FIG. 1 and 2 can have any arbitrary value N larger than one. The antennas 20, 22 ... 24 can have different positions or different polarization states, or a combination thereof.

Figure 3:
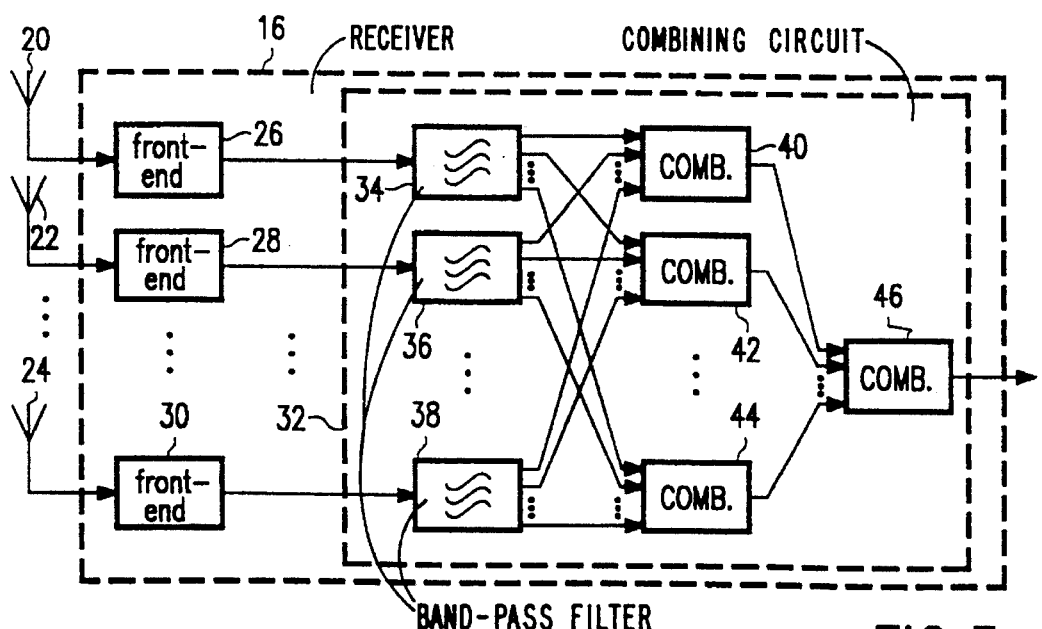
FIG. 3 shows a diversity transmission system according to the invention for transmission of wide band signals.

In the receiver 16 according to FIG. 3 a number of N receiving antennas 20, 22 ... 24 are coupled to N inputs of the receiver 16. In the receiver these inputs are connected to corresponding N front ends 26, 28 ... 30. The outputs of the front ends 26, 28 ... 30 are connected to N inputs of combining means 32. According to the inventive concept of the present invention, each input of the combining means is connected to separating means 34, 36 ... 38 for separating the broadband signal into a number of sub-band signals.

Outputs of the separating means 34, 36 ... 38 carrying sub-band signals in the same sub-band, are connected to inputs of sub-band combining means 40, 42 ... 44. The number of sub-bands is assumed to have a value L. Outputs of the sub-band combining means 40, 42 ... 44 are connected to final combining means to obtain a combined broad band signal, for example by simple adding. It is also possible to equalize the power of the output signals of the sub-band combining means before combining. This results in a flat frequency response of the combination of channels for the wide-band signals. The separating means 34, 36 ... 38 can comprise a filter bank comprising L band pass filters having adjacent pass bands for obtaining the L sub-band signals.

Figure 4:
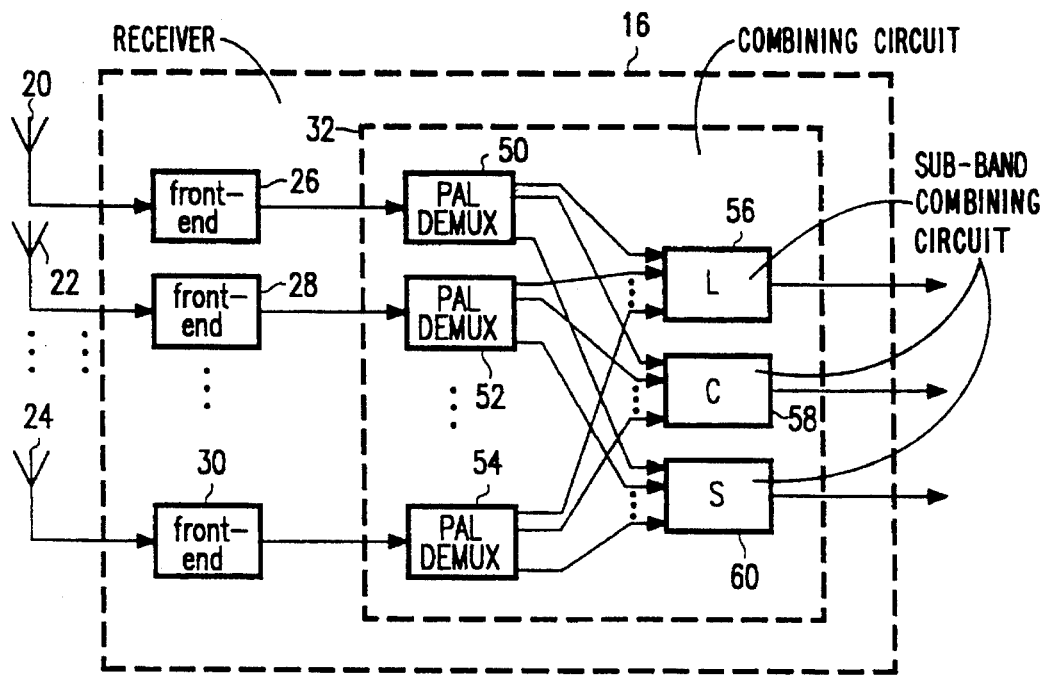
FIG. 4 shows a diversity transmission system according to the invention for transmission of TV signals.

The diversity receiver according to FIG. 4 for reception of a PAL TV signal can be derived from the receiver according to FIG. 3 by replacing the filter banks 34, 36 ... 38 by PAL demultiplexers 50, 52 ... 54 and by omitting the final combining means 46. The PAL demultiplexers 50, 52 ... 54 comprise three filters for separating the luminance signal, the chrominance signal and the sound signal from the IF signal applied to its input by the corresponding front end. For separating the luminance signal from the IF signal from the front end a band-pass having a band width of approximately 5 MHz can be used. For separating the chrominance signal a band pass filter having a band width of approximately 2 Mhz has to be used, and for separating the sound signal a band pass filter and bandwidth of 200–300 kHz is necessary. The center frequency of these filters is determined by the frequency of the IF signal delivered by the front ends 26, 28 ... 30. The three components (sub-bands) of the video signal delivered by the different front ends 26, 28 ... 30 are combined component-wise by the sub-band combining means 56, 58 ... 60 to combined sub-band signals, being a combined luminance signal, a combined chrominance signal and a combined sound signal. Further combination is not needed because these signals can be directly processed by a video display system.

Figure 5:
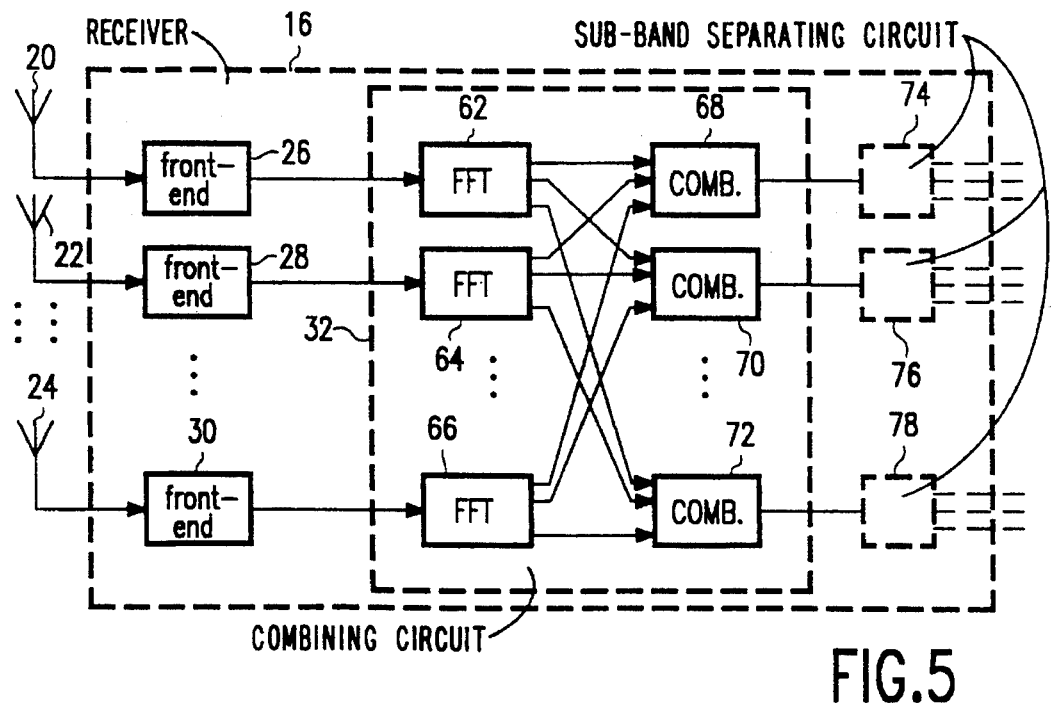
FIG. 5 shows a diversity transmission system according to the invention for transmission of an OFDM signal suitable for e.g. digital audio or video transmission.

The receiver according to FIG. 5 for reception of digitally modulated OFDM signals can be derived from the receiver according to FIG. 3 by replacing the filter banks 34, 36 ... 38 (separating means) by FFT (Fast Fourier Transform) units 62, 64 ... 66 and by introducing analog to digital conversion means into the front ends 26, 28 ... 30. The final combining means 46 (FIG. 3) can be dispensed with.

Orthogonal Frequency Division Multiplexing (OFDM) is a technique to combine many narrow-band signals into one wide-band signal using a Fast Fourier Transform (FFT). OFDM is described in "Analysis and simulation of a digital mobile channel using orthogonal frequency division multiplexing" by L. J. Cimini in IEEE Transactions on Communications COM-33, July 1985, pp. 665–675. A suitable OFDM signal for TV transmission has a band width of 8.192 MHz, containing 1024 subchannels each having a band width of 8 kHz. OFDM is very well suited for transmission over multipath fading channels as the terrestrial VHF/UHF channel. Due to multipath reception, the multipath fading channels have the property of frequency selectivity. In combination with OFDM, this means that the information in each subchannel will display a different effective signal-to-noise ratio. The minimum frequency between narrow-band signals with mutually independent signal-to-noise ratio's is called the coherence bandwidth $B_c$. From measurements with indoor reception, it appears that the fading characteristics in the frequency domain heavily depend of the location of the receiving antenna (spatial fading). Due to this dependence the invention can advantageously be used in combination with OFDM and spatial antenna diversity.

Each of the front ends 26, 28 ... 30 deliver a digital signal to its corresponding FFT unit 62, 64 ... 66.

In the present example the FFT units 62, 64 ... 66 calculate a 1024 points FFT from 1024 consecutive samples of the output signals of the front end. The calculation of an FFT is functionally equivalent to splitting the input signal into 1024 sub-bands. Corresponding sub-bands from different FFT units are combined by the sub-band combining means 62, 64 ... 66 to a combined sub-band signal. At the output of the 1024 sub-band combining means 62, 64 ... 66, the combined sub-band signals (subchannels) are available for further processing.

To reduce the complexity of the system it is conceivable that the output signals of the front-ends 26, 28 ... 30 are splitted in less than 1024 sub-bands, for example 64 sub-bands. After combination to combined sub-band signals by the sub-band combining means, these sub-band signals have to be separated by the sub-band separating means 74, 76 ... 78 into 16 separate signals, to obtain the 1024 subchannels.

A suitable way of combining the sub-band channels is to select one of these channels, by means of a selection switch. This switch can be controlled to select the sub-band having the largest power. It is also possible to control the selection switch according to a measured symbol error rate and to choose the sub-band which results in the smallest symbol error rate. Another possibility is the use of a second selection switch in addition to the first selection switch which scans the sub-bands periodically. Then the first selection switch is set to the position of the second selection switch which gives the best reception quality.

Figure 6:
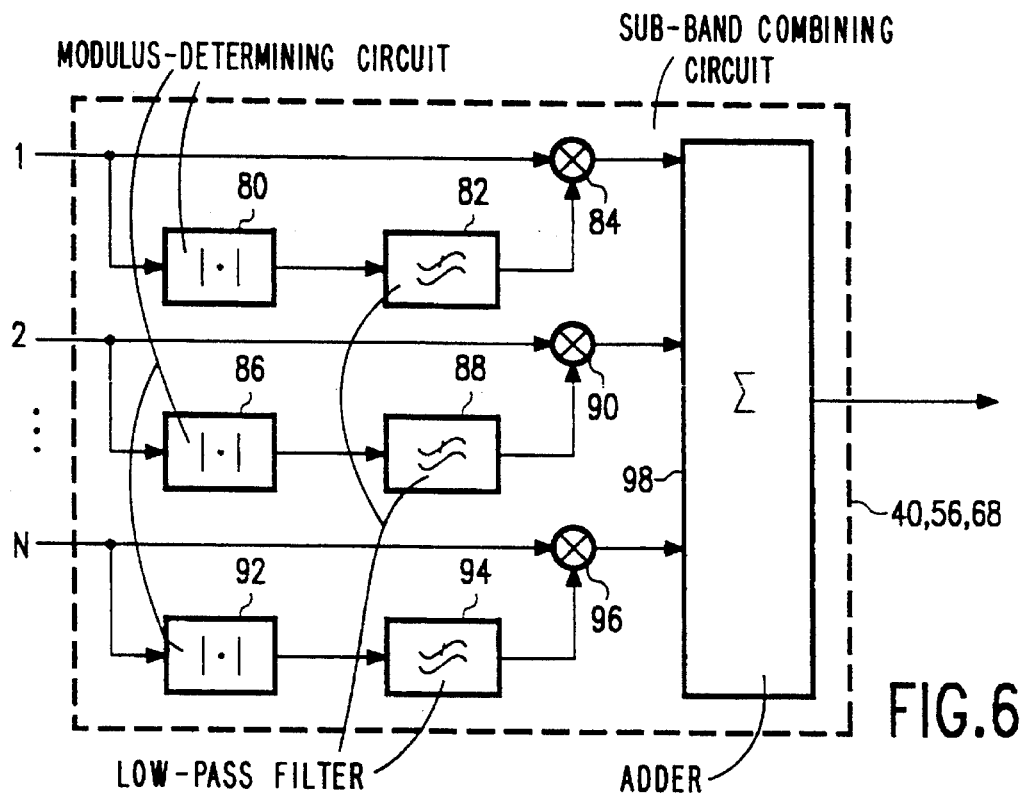
FIG. 6 shows a first embodiment of the sub-band combining means in the FIGS. 3, 4 and 5.

In the sub-band combining means according to FIG. 6, the N sub-band signals to be combined are applied to a first input of a corresponding multiplier 84, 90 ... 96, and to an input of means 80, 86 ... 92 for determining the modulus of the sub-band signal. The output of the means 80 (86) [92] is connected to an input of a low pass filter 82 (88) [94]. The output of the low pass filter 82 (88) [94] is connected to a second input of the multiplier 84 (94) [96]. The output of the multipliers 84,90 ... 96 are connected to inputs of an adder 98. At the output of the adder the combined sub-band signal is available.

For a sub-band signal derived from the received signal from a channel i the following can be written:

$$r_i = \alpha_i \cdot S + n_i \tag{1}$$

In (1) $r_i$ is the $i^{th}$ sub-band signal of N sub-band signals to be combined, $\alpha_i$ is the complex attenuation factor of the $i^{th}$ channel of the transmission system, $n_i$ the noise in the $i^{th}$ sub-band channel and S is the signal to be transmitted in the sub-band. The combiner according to FIG. 6 then determines the value:

$$S_c = S \sum_{i=1}^{N} |\alpha_i| \cdot \alpha_i + \sum_{i=1}^{N} |\alpha_i| n_i \tag{2}$$

The most favorable situation occurs when the argument of all values $\alpha_i$ is the same. Then (2) can be written as:

$$S_c = S \cdot e^{j\theta} \cdot \sum_{i=1}^{N} |\alpha_i|^2 + \sum_{i=1}^{N} |\alpha_i| n_i \tag{3}$$

In which $\theta$ is the argument of $\alpha_i$. For the signal power can be derived from (3):

$$E = \overline{|S|^2} \cdot \left( \sum_{i=1}^{N} |\alpha_i|^2 \right)^2 \tag{4}$$

It is assumed the noise signals of all channels are uncorrelated and have an equal power $n^2$. For the noise power can now be written:

$$P_n = \overline{|n|^2} \cdot \sum_{i=1}^{N} |\alpha_i|^2 \tag{5}$$

For the signal to noise ratio of the combined signal can now be found:

$$\frac{E}{P_n} = \frac{\overline{|S|^2}}{\overline{|n|^2}} \cdot \sum_{i=1}^{N} |\alpha_i|^2 \tag{6}$$

From (6) it can be observed that the signal powers of all channels are added. However this is only the case when the arguments of all complex attenuation factors $\alpha_i$ are the same, In general the total signal to noise ratio will be lower than the value according to (6).

Figure 7:
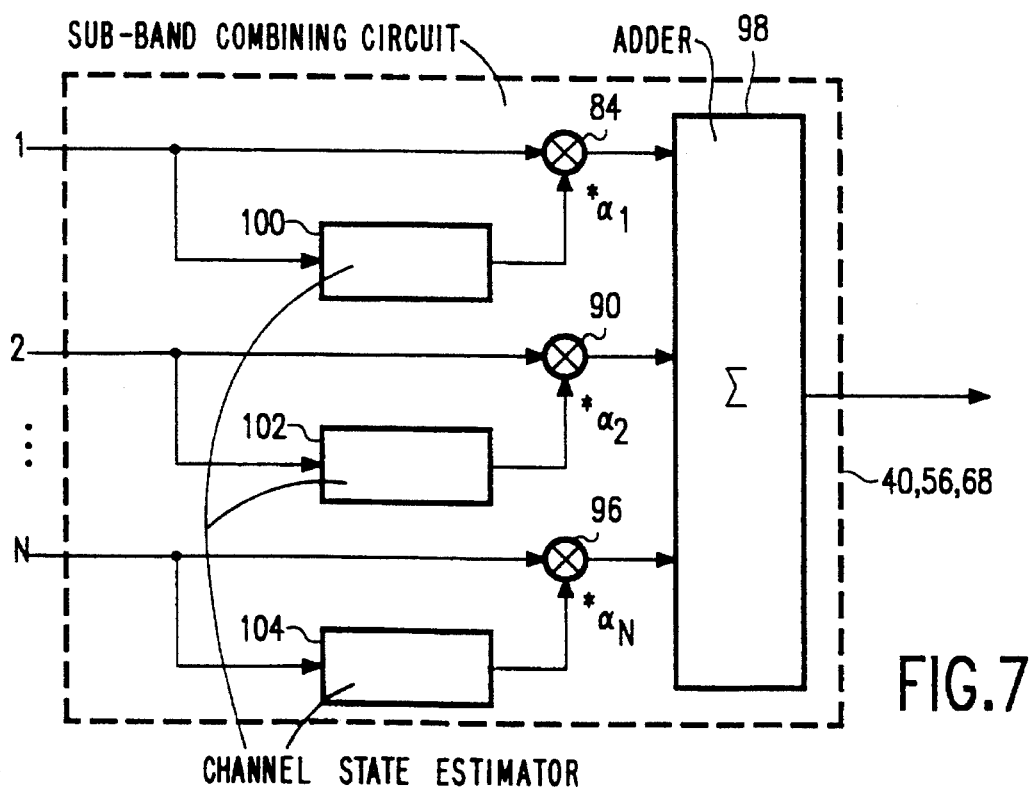
FIG. 7 shows a second embodiment of the sub-band combining means in the FIGS. 3, 4 and 5.

The sub-band combining means according to FIG. 7 can be derived from that according to FIG. 6 by replacing the combination of the means for determining the modulus of the sub-band signal and the low pass filter by a channel state estimator 100, 102, 104 which makes an estimation of the complex attenuation factor of a sub-band in a certain channel. The multipliers 84,90 ... 96 are used for multiplying the sub-band signal with the complex conjugate of the estimate of the complex attenuation factor of the sub-band. For the output signal of the sub-band combiner according to FIG. 7 can now be written:

$$S_c = S \cdot \sum_{i=1}^{N} \alpha_1 \cdot \alpha_1^* + \sum_{i=1}^{N} n_1 \cdot \alpha_i^* \tag{7}$$

By replacing the product of $\alpha_i$ and $\alpha_i^*$ by $|\alpha_i|^2$ (7) changes into:

$$S_c = S \cdot \sum_{i=1}^{N} |\alpha_1|^2 + \sum_{i=1}^{N} n_i \cdot \alpha_i^* \tag{8}$$

From (8) can easily be derived that the signal power and the noise power are equal to the signal- and noise power according to (4) and (5) respectively. However (8) is valid for all circumstances, in contradistinction to (3) which is only valid if the argument of every $\alpha_i$ has the same value. Consequently the signal to noise ratio for the sub-band combiner according to FIG. 7 is given by (6).

The estimation of $\alpha$ can be done in various ways known in the art. For digital signals, use can be made of the vast amount of methods for determining the transfer functions of a channel used in adaptive pass band equalization. A number of these methods are for example described in the book "Digital Communication" by Lee and Messerschmitt, 1990, ISBN 0-89838-274-2, Chapter 9.5, pp. 309–402. A method which can also be used for analog signals is disclosed in the book "Microwave Mobile Communications", By Jakes, 1974, Wiley, Chapter 6.3, FIG. 6.3—3. The only modification that has to be performed is the omitting of the limiting operation described at page 426, however it is also possible to obtain a usefull combining operation when the limiting operation is used.

In the sub-band combining means 40 according to FIG. 8 the channel state estimator is replaced by a delay element 100a, 102a 104a having a delay time T. This type of sub-band combining means can be used for differential coded digital transmission. For the input signal of the $i^{th}$ input of the combiner 40 can be written:

$$r_{ij} = S_j \cdot \alpha_i + n_{ij} \tag{9}$$

In (9) $r_{ij}$ is the input signal at the $i^{th}$ input of the sub-band combining means at instant $jT$, $S_j$ is the transmitted signal at instant $jT$ and $n_{ij}$ is the noise signal at the $i^{th}$ input of the sub-band combining means at instant $jT$. For the output signal of the $i^{th}$ multiplier can be derived:

$$r_i' = \alpha_i \cdot \alpha_i^* + \alpha_i (S_j \cdot n_{ij-1}^* + S_{j-1}^*) + n_{ij} \cdot n_{ij-1}^* \tag{10}$$

At a large signal to noise ratio the cross product of the noise terms can be neglected. For the output signal of the sub-band combining means 40 can be written:

$$r_j = s_j \cdot s_{j-1}^* \sum_{i=1}^{N} \alpha_i \cdot \alpha_i^* + \tag{11}$$

$$s_j \sum_{i=1}^{N} \alpha_i \cdot n_{ij-1}^* + s_{j-1}^* \sum_{i=1}^{N} \alpha_i \cdot n_{ij}$$

Assuming differential coding at the transmitter, for example Differential Phase Shift Keying, and assuming statistical independence of the noise signals, leads to the following expression for the signal to noise ratio:

$$\frac{P_s}{P_n} = \frac{\overline{|S_j|^2}}{2 \cdot \overline{|n|^2}} \cdot \sum_{i=1}^{N} |\alpha_i|^2 \tag{12}$$

From (12) can be seen that always a near optimal (3 dB loss) combining of the sub-band signals is obtained, without the need of a carrier recovery system as was needed for the sub band combining means 40 according to FIG. 7.

Figure 9A:
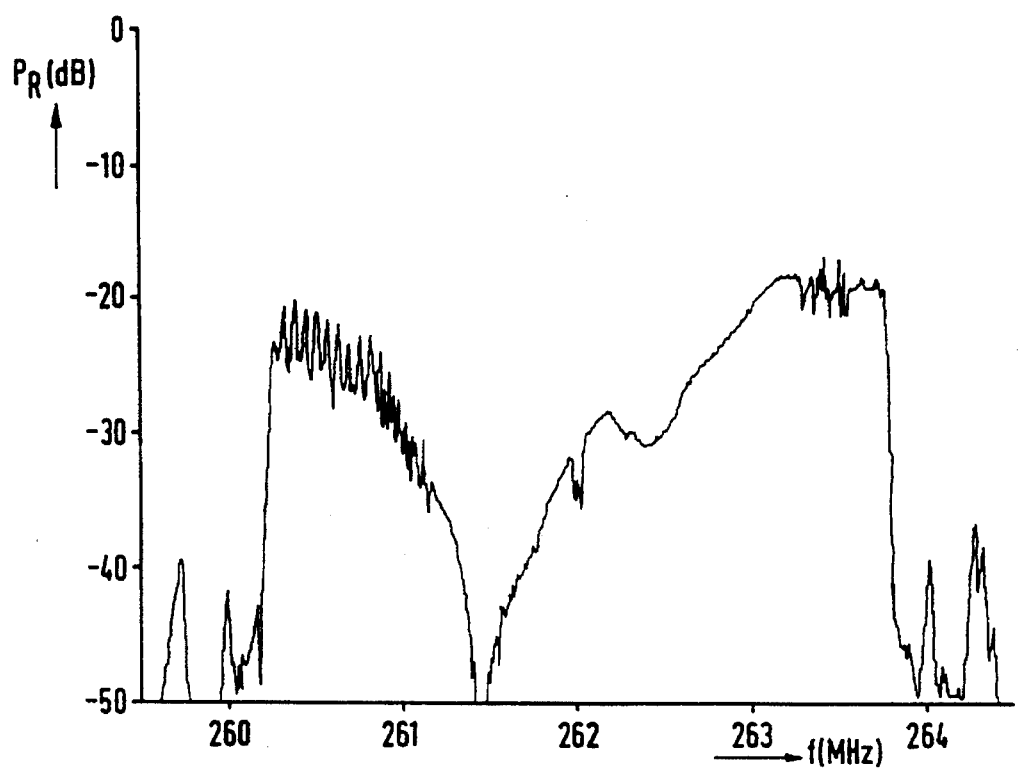
FIG. 9 shows plots of the (indoor) received spectrum of an OFDM signal at two different positions of the receiving antenna.
Figure 9B:
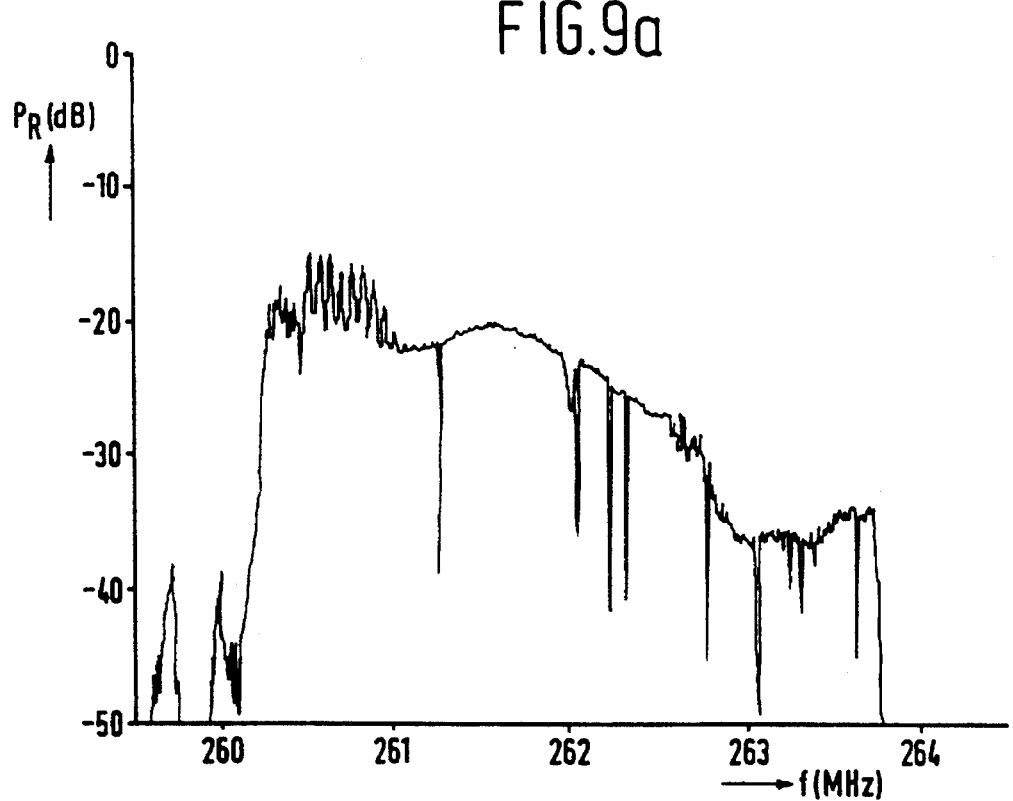

FIG. 9a and FIG. 9b show plots of the power spectrum of an (originally white) OFDM signal, having a carrier frequency of 762 MHz and a bandwidth of 3.5 MHz, received in a building from a transmitter outside the building. These two power spectra were measured at two receiving antenna positions at a distance of 1 meter. It can be seen that the location of fades is strongly dependent of the antenna position. From these figures also can be seen that it is possible to obtain a signal without fades by using the combining technique according to the invention.

What is claimed is:

1. Diversity transmission system comprising a transmitter, said transmitter being coupled to a receiver via a plurality of channels, said receiver comprising combining means for combining the output signals of the channels, characterized in that the combining means comprises separating means for separating the output signal of each channel into a plurality of different frequency sub-band signals and in that the combining means comprises frequency sub-band combining means for combining corresponding frequency sub-band signals from different channels into combined frequency sub-band signals.

2. Diversity transmission system according to claim 1, characterized in that the receiver comprises a plurality of antennas at different positions for obtaining the output signal of a corresponding channel.

3. Diversity transmission system according to claim 2, characterized in that the receiver comprises a plurality of antennas having different polarization states for obtaining the output signal of a corresponding channel.

4. Diversity transmission system according to claim 2, characterized in that the output signal of a channel comprises a Frequency Division Multiplexed signal, and in that a frequency sub-band comprises at least one component of the frequency division multiplexed signal.

5. Diversity transmission system according to claim 2, characterized in that the frequency sub-band combining means is arranged for determining a weighted frequency sub-band signal from each frequency sub-band signal and for combining the weighted frequency sub-band signals.

6. Diversity transmission system according to claim 1, characterized in that the receiver comprises a plurality of antennas having different polarization states for obtaining the output signal of a corresponding channel.

7. Diversity transmission system according to claim 6, characterized in that the output signal of a channel comprises a Frequency Division Multiplexed signal, and in that a frequency sub-band comprises at least one component of the frequency division multiplexed signal.

8. Diversity transmission system according to claim 6, characterized in that the frequency sub-band combining means is arranged for determining a weighted frequency sub-band signal from each frequency sub-band signal and for combining the weighted frequency sub-band signals.

9. Diversity transmission system according to claim 1, characterized in that the output signal of a channel comprises a Frequency Division Multiplexed signal, and in that a frequency sub-band comprises at least one component of the frequency division multiplexed signal.

10. Diversity transmission system according to claim 9, characterized in that the output signal of a channel comprises an Orthogonally Frequency Division Multiplexed signal.

11. Diversity transmission system according to claim 1 characterized in that the frequency sub-band combining means is arranged for determining a weighted frequency sub-band signal from each frequency sub-band signal and for combining the weighted frequency sub-band signals.

12. Receiver for receiving a plurality of output signals from a plurality of channels comprising combining means for combining the output signals of the channels, characterized in that the combining means comprises separating means for separating the output signals of the channels into a number of different frequency sub-band signals and in that the combining means comprises frequency sub-band combining means for combining corresponding frequency sub-band signals from different channels into combined frequency sub-band signals.

13. Receiver according to claim 12, characterized in that the receiver comprises a plurality of antennas for obtaining the output signals of the channels.

14. Combining means for combining a plurality of output signals from different channels, characterized in that the combining means comprises separating means for separating the output signals of the channels into a number of different frequency sub-band signals and in that the combining means further comprises frequency sub-band combining means for combining corresponding frequency sub-band signals from different channels into combined frequency sub-band signals.

* * * * *